United States Patent
Alderman

(10) Patent No.: US 6,857,238 B2
(45) Date of Patent: Feb. 22, 2005

(54) HEAT INSULATOR WITH AIR GAP AND REFLECTOR

(75) Inventor: Robert J. Alderman, Canyon Lake, TX (US)

(73) Assignee: J. A. Effect, LLC, Seguin, TX (US)

( * ) Notice: Subject to any disclaimer, the term of this patent is extended or adjusted under 35 U.S.C. 154(b) by 0 days.

(21) Appl. No.: 10/255,740

(22) Filed: Sep. 26, 2002

(65) Prior Publication Data

US 2004/0000113 A1 Jan. 1, 2004

Related U.S. Application Data

(63) Continuation-in-part of application No. 10/186,454, filed on Jun. 28, 2002, now abandoned.

(51) Int. Cl.[7] .............................................. E04B 1/74
(52) U.S. Cl. ...................... 52/407.3; 52/406.3; 52/407.5
(58) Field of Search ............................ 52/407.3, 407.5, 52/749.12, 783.19, 742.12, 406.1, 406.2, 406.3; 429/77, 78

(56) References Cited

U.S. PATENT DOCUMENTS

| | | | | |
|---|---|---|---|---|
| 1,758,418 A | * | 5/1930 | Vincent | 428/78 |
| 4,263,763 A | * | 4/1981 | Bouwens | 52/404.3 |
| 5,082,335 A | * | 1/1992 | Cur et al. | 312/401 |
| 5,119,612 A | * | 6/1992 | Taylor et al. | 52/410 |
| 5,491,952 A | * | 2/1996 | Alderman et al. | 52/749.12 |
| 5,601,897 A | * | 2/1997 | Vermilion et al. | |
| 5,653,081 A | * | 8/1997 | Wenrick et al. | 52/742.12 |
| 5,685,123 A | * | 11/1997 | Alderman et al. | 52/749.12 |
| 5,787,668 A | * | 8/1998 | Carkner et al. | 52/408 |
| 5,918,436 A | * | 7/1999 | Alderman | 52/407.3 |
| 5,921,057 A | * | 7/1999 | Alderman et al. | 52/746.11 |
| 5,987,833 A | * | 11/1999 | Heffelfinger et al. | 52/406.2 |
| 6,349,518 B1 | * | 2/2002 | Chacko | 52/404.1 |
| 6,509,072 B2 | * | 1/2003 | Bening et al. | 428/35.4 |
| 6,557,313 B1 | * | 5/2003 | Alderman | 52/407.3 |

* cited by examiner

*Primary Examiner*—Carl D. Friedman
*Assistant Examiner*—Nahid Amiri
(74) *Attorney, Agent, or Firm*—Thomas, Kayden, Horstemeyer & Risley, LLP

(57) ABSTRACT

The heat insulator includes a lower sheet (14) that is larger is both length and width than the upper sheet (12) so that the heat insulator can span over objects such as purlins, rafters and obstructions in a roof structure while maintaining the air gap (20) between the sheets. The air gap protects the reflectivity of the inner surfaces of the sheets, thereby preserving the ability of the sheets to reflect radiant heat. The larger, lower sheet can be formed in a single catenaries from edge to edge of the sheet, or in a multiple array of catenaries to form parallel, tubular air gaps (26), if desired. The heat insulator can be mounted to fibrous insulation (22) or to other more rigid structures, if desired, when placed in a roof structure.

12 Claims, 6 Drawing Sheets

HEAT INSULATOR WITH AIR GAP AND REFLECTOR

CROSS REFERENCE TO RELATED APPLICATION

This is a continuation-in-part of U.S. patent application Ser. No. 10/186,454 filed Jun. 28, 2002 now abandoned in the U.S. Patent and Trademark Office.

FIELD OF THE INVENTION

This invention relates generally to heat insulation devices for building structures. More specifically, the present invention relates to a heat insulator that utilizes an air gap and a radiant barrier for retarding the transfer of heat through a building structure, such as the roof of a building.

BACKGROUND OF THE INVENTION

Heat insulation for building structures, used in attics, walls, floors, etc., typically comprises loose material that can be blown into place, particularly into attics, or blanket material that can be manually placed between parallel studs, joists, etc. Generally, the insulation material forms a network of air pockets or gaps which retard the transfer of heat by convection and conduction. The blanket material can comprise fiberglass, cellulose, mineral wool, and other particulate material that traps a multitude of air gaps or spaces between the fibers or other discrete items in the blanket.

In addition to using the fiber sheet insulation material for convection and conduction insulation, it is also possible to use a heat reflective material to function as a radian heat barrier. The radiant heat barrier can be used alone or in combination with the conduction and convection heat insulation. The radiant heat barrier can comprise a sheet of foil that has heat reflective surfaces on one or both sides. The foil sheet can be attached to convection and conduction heat insulation material for providing added radiant energy with reflective properties, thus adding to the total insulating value of the insulation assembly. Typically, the assembly would be placed between parallel joists, studs, etc of an outside wall of a building structure. However, it has been found that when the reflective foil sheet makes contact with adjacent surfaces, the foil loses its heat reflective properties in the area where contacted.

Because of this characteristic, the tendency for providing a heat reflective insulation sheet is to arrange the sheet so it contacts as few as possible adjacent surfaces. For example, my U.S. Pat. No. 5,918,436 discloses an insulating finishing material having multiple sheets of foil of different areas attached together at the edges so that when suspended between parallel joist, etc., the lower sheet sags due to gravity a distance away from the upper sheet, creating an air gap between the sheets. This air gap functions as insulation from convection and conduction heat transfer, but also protects the internal radiant barrier provided by the foil from contact with other objects, thereby maintaining its heat reflective properties. Additionally, the enclosed space formed by the two overlying sheets usually prevents the invasion of dust, stray fibers, grit, sawdust, and other materials that might otherwise make contact with the reflective surface and reduce the reflective capability of the surfaces.

While the radiant barrier concept as disclosed in my U.S. Pat. No. 5,918,436 is effective to this end, it is highly desirable to have the insulation structure in elongated configuration that will be able to span across adjacent purlins or across adjacent rafters or other objects in the roof structure, and assume an inflated configuration on opposite sides of such objects. This inflation of the radiant barrier insulation on opposite sides of the purlins, etc. on which the radiant barrier rests creates the desired air gap between the radiant reflective surface and the facing material. This preserves the reflective capability of the radiant material. It is to this improvement that this invention is focused.

SUMMARY OF THE INVENTION

Briefly described, the present invention comprises an insulating system that limits not only heat of convection and conduction, but also limits the heat of radiation, to reduce and retard the heat transfer between adjacent spaces. Typically, the insulating device will be used in building structures between spaces of different temperatures, such as in exterior walls, exterior floors, and exterior ceilings, to retard the transfer of heat between these spaces.

In a preferred embodiment of this invention, lengths of flexible sheet material are placed in superposed relationship with respect to each other. The flexible sheet material typically will be in two layers, such as a first or upper elongated flexible sheet and a second or lower elongated flexible sheet with the sheets superposed and with their lengths extending parallel and the sheets joined to each other at their side edges. The lower sheet is of greater width than the upper sheet. The lower sheet is also of greater length than said upper sheet for a given length of the upper sheet. But the two sheets occupy the same "foot print." This size difference of the sheets results in the lower sheet being of larger area and assuming wrinkles when the two sheets are placed in abutment with each other, as when rolled in a coil for storage or shipment.

When the sheets are spread as when being installed in a roof structure, the first or upper sheet is spread substantially flat with the second or lower sheet below the first sheet so that the lower sheet tends to expand away from the upper sheet due to its weight and the effects of gravity. This forms an air gap between the adjacent sheets.

Preferably, at least one of the adjacent first or second elongated flexible sheets will have a heat reflective surface, with the heat reflective surface facing the opposite sheet. With this arrangement, the reflective surface is enclosed within the air gap between the adjacent sheets, thereby protecting the reflective surface from any accumulation of dirt, sawdust, dust, or other types of debris that might normally be encountered in the environment about the insulation assembly.

In another preferred embodiment of the invention, a first, relatively flat elongated sheet can be mounted to an additional insulation structure, such as to a facing surface of a fibrous blanket, such as a fiberglass blanket, mineral wool blanket, cellulose blanket, or other supportive structure that preferably is more rigid than the flexible superposed sheets if the blanket is to support the sheets. The blanket, along with its attached overlying reflective sheets, can be installed in a roof structure, for example, with the second reflective sheet facing downwardly. The blanket can be supported at its edges on adjacent purlins, with the second sheet expanded downwardly away from the first sheet, thereby forming an air gap between the sheets, with the sheets protecting the interior reflective surface of at least one of the sheets.

The second sheet that is expandable away from the first sheet can be attached only at its opposite edges to the first sheet, making a relatively large air gap that spans the breadth of the sheets, from edge to edge of the sheets. In this configuration, the edges of the blanket material can be mounted on the top surfaces of, or between ones of the purlins of a roof structure.

In another embodiment, the second sheet is adhered to the first sheet at closer spaced intervals, forming elongated tube-like cavities that appear to be corrugations when viewed from the exterior, with the tube-like cavities defining smaller air gaps. Again, the inner surface of at least one of the flexible sheets bears a radiant heat reflective material, thereby forming a reflective heat barrier.

An advantage of the invention is that the second or lower sheet that sags to form air gaps with respect to the first or upper sheet can be compressed toward abutment with the upper sheet, as when extending over a rafter, a purlin, a conduit or electrical wire, or other objects that are typically present in a roof structure. The lower sheet simply is folded upwardly by the object to accommodate the object. In order to accommodate the obstacles in a roof structure, the disclosed invention utilizes the extra length and width of the lower sheet, so that it is capable of sagging immediately in the vicinity adjacent the obstacle on which it rests. The greater length and width of the lower sheet allows the lower sheet to sag about or "straddle" the object and resume its sagging configuration immediately adjacent the object, thereby maximizing the effect of its insulative properties.

The disclosed invention includes a process by which the heat insulator with its air gap and reflector is manufactured. In a preferred embodiment, the two lengths of sheet material are moved into superposed, overlying relationship, with the second sheet being of greater length and breadth than the first sheet. As the second sheet moves toward the first sheet, the second sheet is extended through a turn about a roller that bears annular protrusions, so that longitudinal grooves are formed in the sheet material. On the opposite side of the sheet, an adhesive applicator is utilized to coat the protruding ribs being formed in the larger sheet.

As the larger sheet continues to move toward engagement of the smaller sheet, it also engages a vacuum roll that gathers small lengths of the sheet momentarily so as to accumulate an additional length of the larger sheet and then releases the gatherings so that the sheet continues to move in unison with the smaller sheet. The two sheets are married by pressing them together, with the ribs of adhesive applied to the larger sheet being bonded to the smaller sheet, thereby holding the sheets together in the configuration as described above.

The larger sheet can be configured with only two ribs of adhesive, one at each side edge of the larger sheet so that just the edges of the two sheets are bonded together. This results in the sheets defining a large, single air gap therebetween. However, with additional annular protrusions mounted on the roll that forms the elongated ribs in the larger sheet, other configurations can be achieved, such as the one mentioned above where a multitude of tubular air gaps are formed between the sheets.

Thus, it is an object of this invention to provide an improved heat insulator for a building structure that utilizes air gaps and reflective surfaces for insulating the building structure.

Another object of this invention is to provide an improved system for fabricating a heat insulator for the roof and wall structures of a building that is expedient to produce, and with an end product that is expedient to install.

Another object of this invention is to provide an inexpensive, durable, and easy to install blanket insulation assembly for building structures.

Another object of this invention is to provide improved heat insulation for building structures that provides conduction, convection, and radiant heat insulation.

Other objects, features and advantages of this invention will become apparent upon reading the following specification when taken in conjunction with the accompanying drawings.

DETAILED DESCRIPTION

Figure 1:
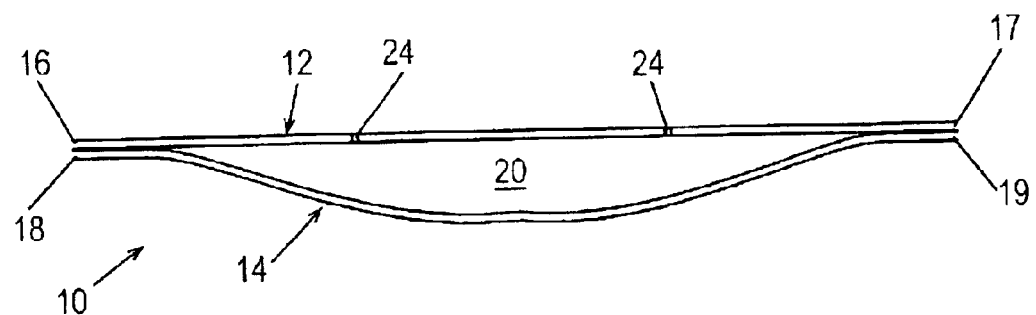
FIG. 1 is a cross sectional view of a heat insulator with air gap and reflector, showing overlying sheets of material defining an air gap therebetween.

Referring now in more detail to the drawings, in which like numerals indicate like parts throughout the several views, FIG. 1 illustrates a heat insulator 10 that includes an air gap and a reflective surface. The heat insulator includes a first or upper, smaller sheet of flexible material 12 and a second or lower, larger sheet 14 of flexible material, with the sheets being in superposed, overlying relationship. The sheets are elongated, with the side edges 16 and 17 of the smaller sheet 12 aligned with the side edges 18 and 19 of the larger sheet 14. The side edges 16 and 18 are bonded together and the side edges 17 and 19 are likewise bonded together. The edges 16 and 18 are in alignment with one another, while edges 17 and 19 are in alignment with one another.

The second, lower sheet 14 is of larger length and of larger breadth than the upper, smaller sheet 12, for any given segment of the sheet 12.

With the arrangement of FIG. 1, when the upper, smaller sheet 12 is stretched flat, and the lower, larger sheet 14 is located below the smaller sheet, the larger sheet will sag downwardly to form an air gap 20 between the sheets.

It is a feature of the invention that the second, lower larger sheet 14 is of greater length and width than the upper sheet 12 for any segment of the upper sheet 12.

The sheet material can be formed of a material selected from a group of materials consisting essentially of one of white vinyl, polyvinyl chloride, polyethylene, and polypropylene.

Figure 2:
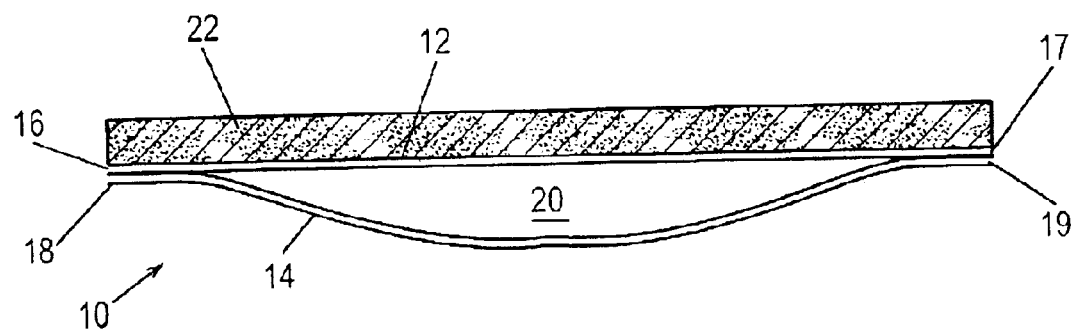
FIG. 2 is a cross sectional view of the heat insulator of FIG. 1, but showing it attached to a more rigid blanket of heat insulation material.

FIG. 2 shows the upper smaller sheet 12 of the heat insulator 10 adhered in a flat configuration to a flat surface of fibrous insulation blanket 22. The insulation blanket can be formed of various conventional wall insulation materials, such as fiberglass, mineral wool, cellulose, or gypsum. Preferably, the blanket 22 is more rigid than the heat insulator 10, and tends to hold the smaller sheet of the heat insulator 10 in its stretched configuration as shown in FIG. 2.

In the embodiment illustrated in FIG. 1, Kraft paper can be bonded to the exterior surface of the smaller, upper sheet 12 to help rigidify the sheet.

In order to make sure that the larger, lower sheet 14 of the heat insulator expands away from the smaller, upper sheet 12 when installed in a roof structure, small openings 24 are formed in the upper sheet to allow the ingress and egress of air that forms the air gap 20. This allows the heat insulator 10 to be rolled up in a reel, with the lower, larger sheet 14 collapsed against the upper, smaller sheet 12, with the air gap dissipated from between the sheets. When the heat insulator 10 is paid out from its reel and installed as described later, gravity and the weight of the larger, lower sheet 14 tends to move the larger, lower sheet away from the upper, smaller sheet, establishing the air gap 20, with the air entering the air gap through the small openings 24.

Figure 3:
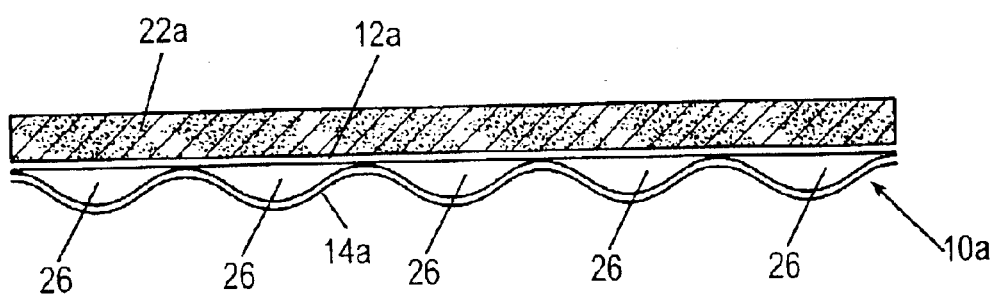
FIG. 3 is a cross sectional view of another embodiment of the heat insulator, showing the lower flexible sheet formed in a corrugated configuration and adhered at the apexes of its corrugated configuration to the upper sheet, forming tubular air gaps therebetween.

FIG. 3 shows another embodiment of the invention whereby multiple tubular air gaps are formed between the upper sheet 12 and the larger, lower sheet 14a. The lower sheet 14a is adhered to the upper sheet 12 at the apexes of the corrugations formed in the lower sheet 14a.

Either one or both of the sheets 12 and 14 can bear a reflective surface. For example, a reflective surface can be formed on the larger, lower sheet 14 or 14a with the reflective surface facing the smaller, upper sheet 12. The reflective surface can be formed by aluminum foil or other metal foils, metalized polyester, or metalized polyethylene. The flexible sheet has its reflective surface facing the opposite sheet. This causes the reflective surface to be enclosed within the confines of the air gap 20 of FIGS. 1 and 2 or the multiple air gaps 26 of FIG. 3. This protects the reflective surface from being occluded by dust, debris, etc. that typically is present in a roof structure, particularly in the roof structure of an industrial building. Also, the use of both the upper sheet 12 and the larger, lower sheet 14 to form the air gap tends to seal the air gap from any fallout of the fibrous material of the insulation blanket 22 of FIG. 2 or of FIG. 3.

Figure 4:
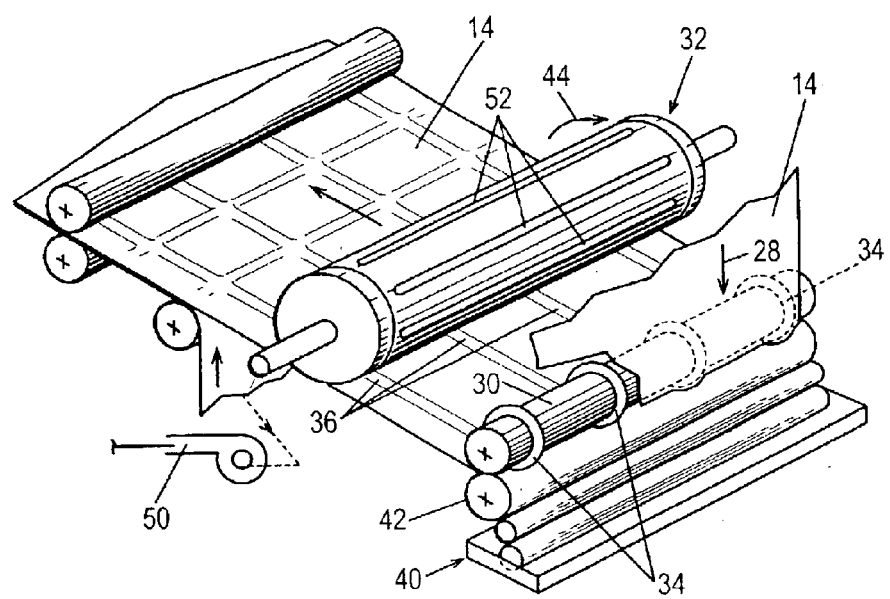
FIG. 4 is an isometric view of a portion of the system for forming the heat insulator.
Figure 5:
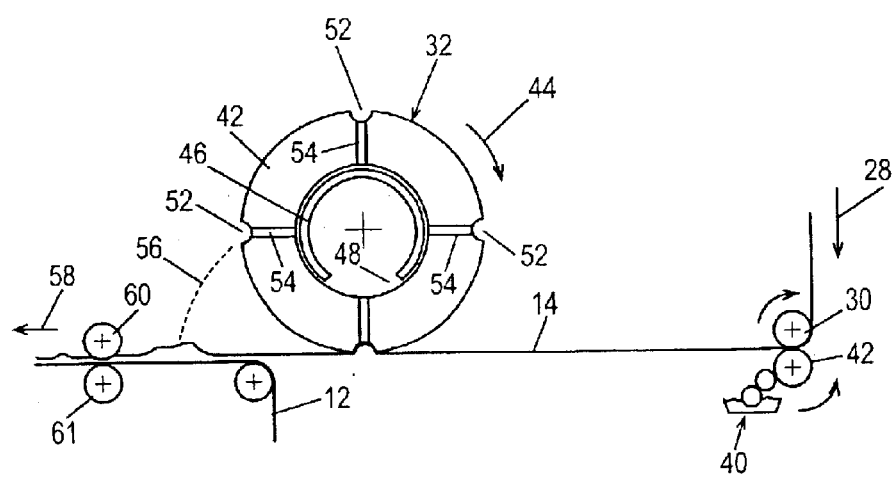
FIG. 5 is a side cross sectional view of the system of FIG. 4, showing the vacuum roll and its adjacent elements.

FIG. 4 illustrates a process by which the heat insulator of FIGS. 1–3 can be manufactured. A supply of the larger, lower sheet 14 is advanced in the direction as indicated by direction arrow 28, downwardly about a rib forming roller 30, and then laterally beneath a vacuum roll 32. Rib forming roller 30 includes annular protrusions 34 positioned along its length, with the protrusions arranged to engage the larger sheet 14 as the sheet advances through the system. The sheet travels 90° about the rib forming roller 30 and the annular protrusions 34 form longitudinally extending folds or ribs 36 in the larger sheet 14. This causes the width of the sheet 14 to shrink because of the extra material that is now embodied in the longitudinal ribs 36. The shrinkage of the larger sheet 14 is calculated so as to result in the larger sheet having the same lateral breadth as the smaller, upper sheet 12.

Glue applicator 40 is positioned beneath the rib forming roller 30, and it applies, in a conventional manner, glue from its applicator roller 42 to the downwardly extending protruding ribs 36 formed in the larger sheet 14, resulting in stripes of glue being applied to the sheet.

The stripes of glue can be varied by offering the number of or positions of the annular protrusions 34 of the rib forming roller, by replacing the roller with different protrusion positions, or by adding or subtracting the annular protrusions 34. For example, only two annular protrusions, one at each end of the rib forming roller 30 can be used to form the heat insulator of FIG. 1, or multiple ones of the annular protrusions 34 can be used to form the heat insulator of FIG. 3.

Vacuum roll 32 includes an outer vacuum drum 42 that rotates in the direction indicated by direction arrow 44, and an inner, stationary vacuum applicator shoe 46. The vacuum applicator shoe 46 has a downwardly directed opening 48 formed therein, for applying a vacuum to the interior of the vacuum roll. The vacuum applicator shoe 46 communicates at one end thereof with the inlet of a blower 50 so that an area of reduced air pressure is formed in the vacuum applicator shoe 46 and through its downwardly facing opening 48.

Outer vacuum drum 42 includes recesses 52 formed along its length, and each recess communicates through a canal with the interior of the outer vacuum drum 42. As each canal 54 moves past the opening 48 of the vacuum applicator shoe 46, a reduced air pressure is applied by the downwardly facing recess 52 to the larger sheet 54, drawing some of the sheet into the recess. This tends to form a wrinkle or recess in the larger sheet, thereby lengthening the sheet as it passes beneath the vacuum roll 32. When the canal 54 and recess 52 move beyond the opening 48 of the vacuum applicator shoe 46, the outer vacuum drum releases the larger sheet 14 as indicated by the dashed line 56, so that the larger sheet continues to move along the processing path.

In the meantime, the smaller sheet 12 is moved into underlying, superposed relationship with respect to the larger sheet 14, and advancing in the direction as indicated by direction arrow 58 between the pinch rollers 60 and 61. The pinch rollers urge the smaller and larger sheets 12 and 14 together so that the stripes of glue applied to the larger sheet are also applied to the smaller sheet, thereby bonding the sheets together in the configuration shown in FIGS. 1 or 3.

Figure 6:
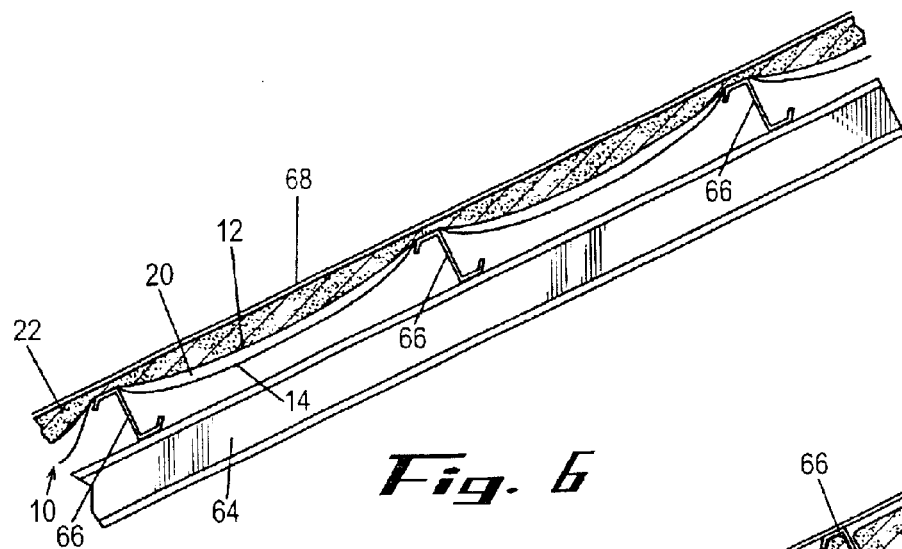
FIG. 6 is a cross section of a portion of a roof structure of an industrial building, showing the heat insulator applied over the purlins and parallel to the rafters of the roof structure.

As illustrated in FIG. 6, the heat insulator 10 and its fibrous blanket 22 can be applied to the roof structure of an industrial building, with the lengths of the fibrous insulation blanket 22 and of the heat insulator 10 extending parallel to the rafters and across the purlins. The segments 68 of the hard sheets of roofing material are applied over the fibrous insulation blanket 22, partially crushing the blanket at the intersections of the purlins. The heat insulator 10 will expand as described before, with the air gap 20 being formed between the adjacent sheets 12 and 14. The adjacent sheets protect their reflective surfaces by being closed about the air gap 20, with the air gap maintaining the gap between the sheets.

Figure 7:
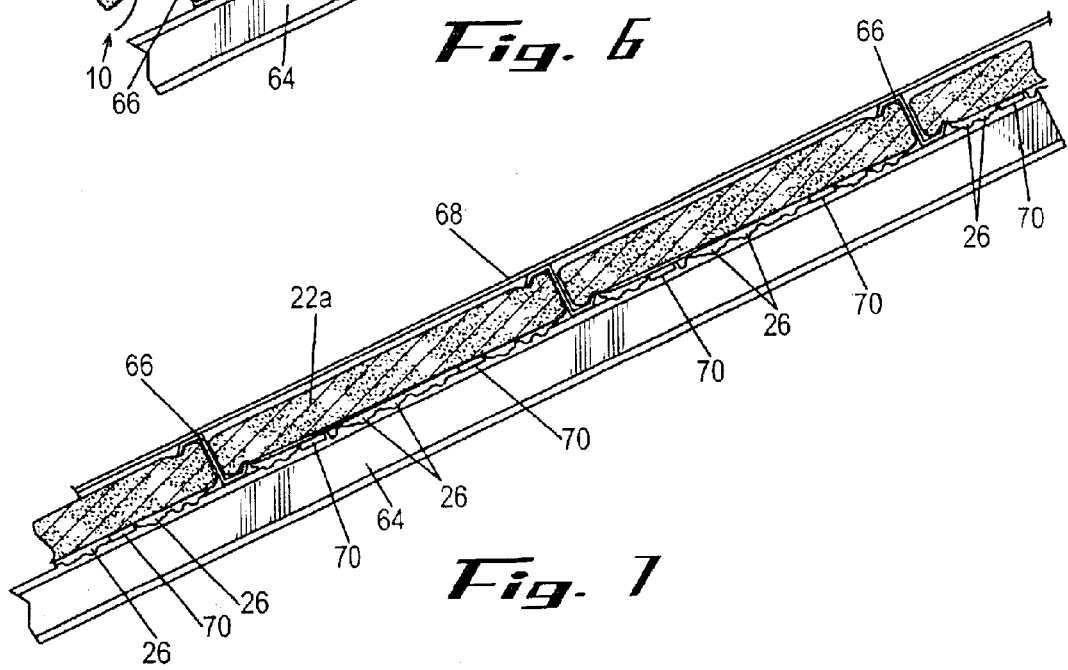
FIG. 7 is a cross section of a portion of a roof structure of an industrial building, showing an alternate embodiment of the invention, with the heat insulator extending parallel to the purlins and supported between the purlins by the rafters.

FIG. 7 shows an installation of the heat insulator 10a and its fibrous insulation blanket 22a having their lengths extending parallel to the purlins 66 and at right angles with respect to the rafters 64. Typically, metal bands 70 are stretched across the rafters for the purpose of supporting the heat insulator 10 and its fibrous insulation blanket 22 in the spaces between the purlins. The tubular air gaps 26 that are formed in the second lower sheet 14 of the heat insulator extend downwardly between the smaller, upper sheet 12 and the lower, larger sheet 14, preserving the reflective abilities of the reflective surfaces of the larger sheet facing upwardly toward the smaller sheet.

Figure 8:
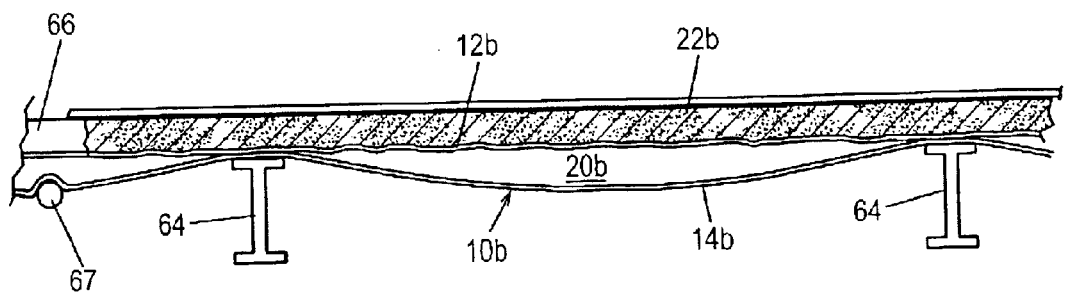
FIG. 8 is a cross section of a portion of the roof of an industrial building, showing how the lower flexible sheet can extend over adjacent ones of the rafters and other obstructions in the roof structure.

FIG. 8 illustrates the heat insulator 10b applied to a fibrous insulation blanket 22b, as illustrated in FIG. 2, but being applied over rafters 64 and parallel to purlins 66 and possibly over other objects 67 such as HVAC ducts and electrical conduits. This illustrates how the larger, lower sheet 14b is allowed to sag between the rafters 64. The additional length and width of the larger, lower sheet 14b allows the sagging of the lower sheet with respect to the upper sheet 12b, thereby forming the air gap 20b between the sheets. As previously stated, at least one of the sheets 12 or 14 bears a reflective surface that faces the opposite sheet, and is protected by the opposite sheet and by the air gap 20b from occluding its reflectivity.

While FIGS. 6–8 refer to roof structures of industrial buildings, FIGS. 9–12 illustrate the use of the invention in a conventional dwelling structure. The length of the heat insulator 10c extends over and across the parallel rafters 74 of the roof structure, and the additional length of the lower, larger sheet 14c allows it to sag downwardly away from the smaller, upper sheet 12c, forming the air gap 20c therebetween.

Figure 9:
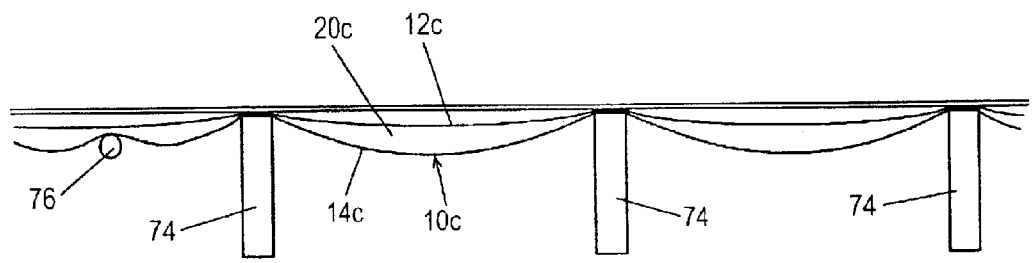
FIG. 9 is a cross section of a portion of a typical roof structure of a dwelling, showing the heat insulator extending across the rafters and parallel to the purlins.

A feature of all the embodiments of the invention is that the lower, larger sheet such as sheet 14c of FIG. 9 can be stretched across other obstructions that might be present in the roof structure, such as a conduit, electrical wiring, or other conventional obstructions in the roof structure, as indicated in 76.

Figure 10:
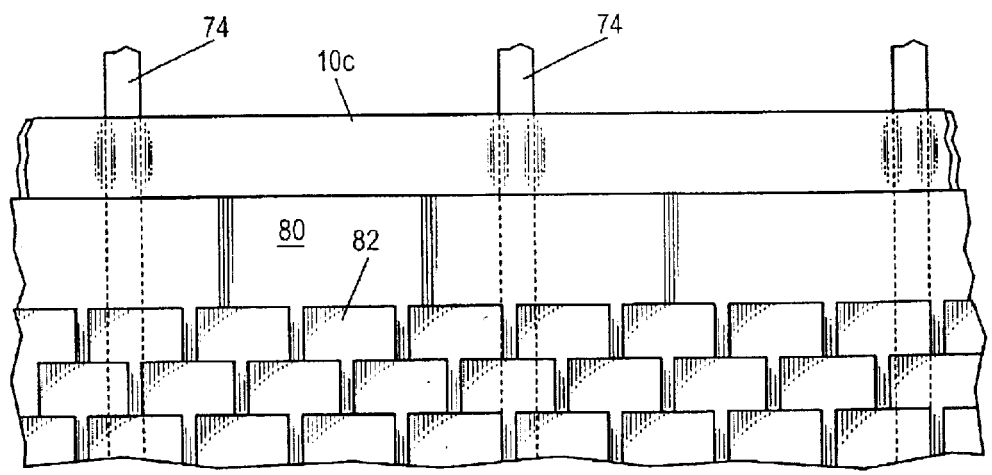
FIG. 10 is a plan view of the heat insulator of FIG. 9, with parts removed for clarity.

FIG. 10 shows the plan view of FIG. 9, indicating the relationship of the rafters 74 and the overlying heat insulator 10c and the next overlying plywood layer 80 and the felts and roof shingles 82.

Figure 11:
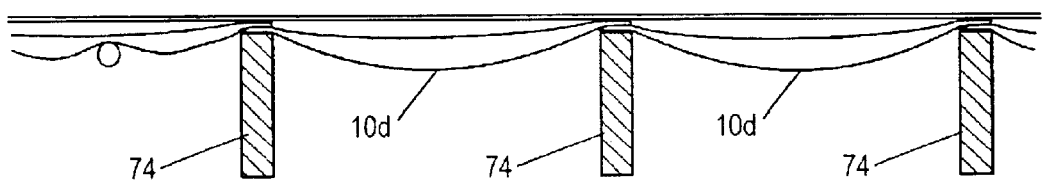
FIG. 11 is a cross sectional view of a portion of a home roof structure, similar to FIG. 9, but with the lengths of the elongated heat insulators extending parallel to the rafters.

FIG. 11 shows the cross section of a portion of a roof structure of a dwelling, with the lengths of the heat insulator 10d extending parallel to the rafters, with their opposite edges resting on the top surfaces of the rafters.

Figure 12:
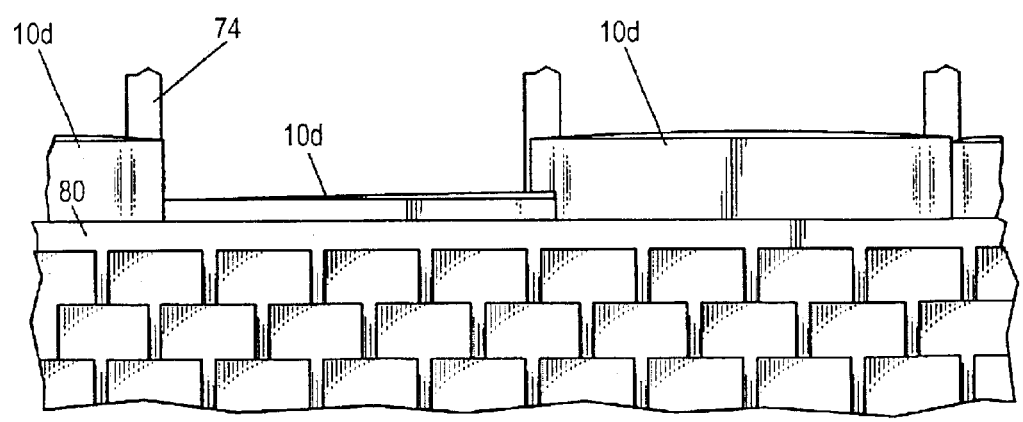
FIG. 12 is a plan view of the heat insulator of FIG. 11, with parts removed for clarity.

FIG. 12, like FIG. 10, shows the relationship of the components of the roof structure, including the rafters 74, the plywood layer 80, and the shingles.

Figure 13:
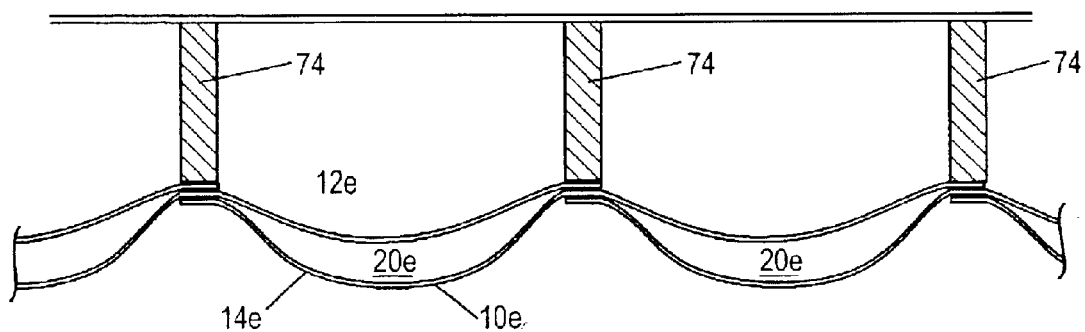
FIG. 13 is a cross sectional view of a roof structure of a building structure, showing a heat insulator attached to the rafters.

While FIGS. 9–12 illustrate the dwelling structure with the heat insulator applied between the rafters and the overlying roof structure, as applied during initial construction of a building, FIG. 13 shows the after installation of the heat insulator 10e to the rafters 74. The edges of the heat insulator are attached by adhesive, or by mechanical connectors to the edges of the rafters 74, and the lower, larger sheet 14e is suspended below the upper, smaller sheet 12e as described before. This forms the air gap 20e between the sheets.

Figure 14:
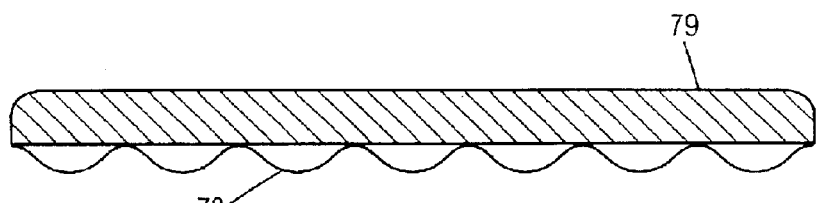
FIG. 14 is a side cross section of another embodiment of the invention, in which the larger lower reflective sheet is attached directly to blanket insulation.

FIG. 14 shows another embodiment of the invention, whereby the larger reflective sheet 78 is directly mounted to heat insulation blanket 79, without the smaller top sheet of the other embodiments. This arrangement can be used when the blanket is formed of material that does not shed much fiber or dust that would occlude the reflective surface of the sheet.

Figure 15:
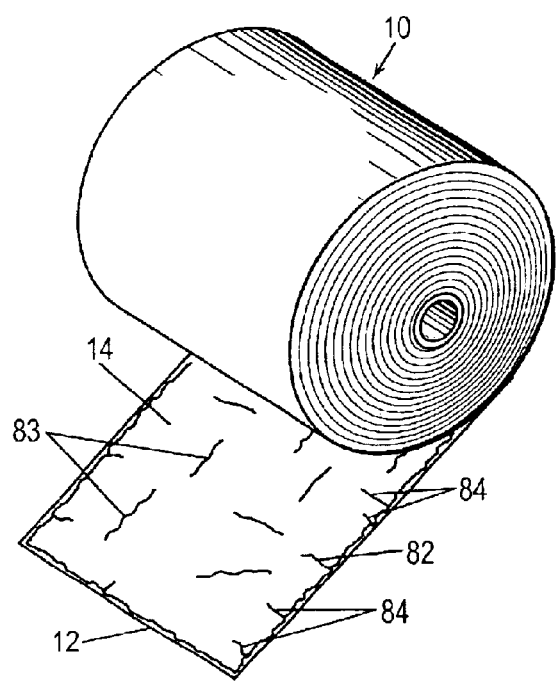
FIG. 15 is an isometric view of the heat insulator rolled into a reel, showing the wrinkles in the larger sheet.

FIG. 15 shows the heat 10 when rolled up into a reel for storage or shipment. The larger sheet 14 usually is wrinkled when in this configuration since it is of greater length and width than the smaller sheet 12. The wrinkles are formed of folds and usually are oriented randomly, including laterally extending folds 82 and longitudinally extending folds 83. The laterally extending folds at the edges of the larger sheet are randomly shirred as indicated at 84.

As described above the heat insulator can be utilized in various configurations due to its versatility created by the longer and wider, larger sheet 14 in comparison to the smaller sheet 12, allowing the heat insulator to extend over obstructions such as rafters, electrical conduits, purlins, water conduits, etc. The extra length and extra width of the larger sheet avoids the stretching of the larger sheet and therefore avoids reduction in amount of air gap between the sheets.

The air gap between the sheets maintains the reflectivity of the inner surfaces of the sheets, thereby avoiding occlusion of the reflectivity of the sheets, and preserving the radiant heat insulation capacity of the heat insulator.

Although preferred embodiments of the invention has been disclosed in detail herein, it will be obvious to those skilled in the art that variations and modifications of the disclosed embodiments can be made without departing from the spirit and scope of the invention as set forth in the following claims.

I claim:

1. A heat insulator for a roof structure comprising:

an elongated first sheet having a predetermined length, opposed side edges, a predetermined width between said opposed side edges, and an intermediate portion between said side edges, an elongated flexible second sheet having a length greater than said predetermined length of said first sheet, side edges, a width between its said side edges greater than said predetermined width of said first sheet, and an intermediate portion between said side edges, said second sheet positioned in superposed relationship with respect to said first sheet and with the lengths of said sheets parallel and the length of said second sheet extended to the same length of said first sheet, and said oppossed side edges of said second sheet aligned with and connected to said opposed side edges of said first sheet, whereby said heat insulator can be stored in a reel with the second sheet collapsed against the first sheet, and when said heat insulator is unreeled, the second sheet is positioned below said first sheet and said sheets are suspended by their opposed side edges with said first sheet not folded, gravity tends to move said intermediate portion of said second sheet away from said intermediate portion of said first sheet to form an air space between said intermediate portions of said sheets, and said second sheet has enough additional length with respect to said first sheet to form folds across its length about structures in the roof, and at least one of said first or second sheets bearing a heat reflective surface facing the other of said first or second sheets.

2. The heat insulator of claim 1, wherein said heat reflective surface is formed of metal.

3. The heat insulator of claim 1, wherein said heat insulator is formed in a spiral roll with said second sheet formed with longitudinally extending folds and laterally extending folds and said intermediate portions of said sheets in abutment with each other and the air space collapsed.

4. The heat insulator of claim 1, wherein said opposed side edges of said second sheet are shined.

5. The heat insulator of claim 1, wherein said second sheet is formed in corrugations extending along the length of said second sheet having apexes facing said first sheet and adhering to said first sheet, forming air gaps extending between said first and second sheets.

6. The heat insulator of claim 1 wherein said first sheet is formed of a material selected from the group of materials consisting essentially of one of fiberglass, mineral wool and cellulose.

7. The heat insulator of claim 1 wherein said first sheet is formed of a material selected from the group of materials consisting essentially of one of white vinyl, polyvinyl chloride, polyethylene, and polypropylene.

8. A heat insulator for a roof structure including parallel rafters and parallel purlins extending normal to and supported by said rafters, the heat insulator comprising:

elongated first and second sheets for positioning adjacent the rafters, each of said first and second sheets having a length dimension, a width dimension, and opposed parallel side edges, and an intermediate portion between its side edges, said first and second sheets arranged with their length dimensions parallel and connected together at their respective side edges in superposed relationship, said second sheet being longer and wider than said first sheet but extended to the same length and width of said first sheet, whereby when said first sheet is stretched substantially flat over said second sheet, said intermediate portion of said second sheet is urged away from said intermediate portion of said first sheet by gravity and forms an air space between said sheets, and when said heat insulator is extended across the lengths of said rafters said second sheet becomes folded about said rafters, and said first and second sheets form air spaces between said rafters, and when said heat insulator is formed in a reel, said heat insulator is deflated with said second sheet collapsed against said first sheet.

9. The roof structure of claim 8, wherein at least one surface of at least one of said first and second sheets bearing a heat reflective surface that faces the other sheet.

10. The roof structure of claim 9, wherein said first sheet is more rigid than said second sheet and is formed of a heat insulation material selected from the group consisting essentially of fiberglass, gypsum board, and mineral wool.

11. A heat insulator for a roof structure comprising:

a first elongated flexible sheet having opposed parallel side edges and formed in a given length, a second elongated flexible sheet having opposed parallel side edges and being of greater length and width than said first elongated flexible sheet and extended to the same length of the first elongated flexible sheet, said first and second elongated flexible sheets attached to each other at their respective opposed side edges so that when said first elongated flexible sheet is extended in a flat configuration with said second elongated flexible sheet positioned below said first elongated flexible sheet said second elongated flexible sheet tends to sag under the influence of gravity with respect to said first elongated flexible sheet to form a space between said first and second elongated flexible sheets, at least one of said first and second elongated flexible sheets having a radiant heat reflective surface facing the other of said first and second elongated flexible sheets, whereby said heat insulator can be stored in a reel, and when the heat insulator is unreeled and extended across a series of laterally extending spaced structural supports, with said second elongated flexible sheet positioned below said first elongated flexible sheet, said second elongated flexible sheet is supported in contact with said first elongated flexible sheet by the structural supports and tends to sag under the influence of gravity beneath said first elongated flexible sheet at intervals between said structural supports and forms substantially closed air spaces between the spaced structural supports.

12. A heat insulator for installation in a building structure comprising:

a first elongated sheet and a second elongated sheet, the lengths of said first and second sheets extending parallel to each other and having edges connected together, one of said sheets having a radiant heat reflective surface facing the other of said sheets, said second sheet being greater in width than said first sheet and greater in length than said first sheet for a given length of said first sheet but extended to the same length of said first sheet so that said second sheet tends to sag below said first sheet when said first sheet is placed in a flat configuration above said second sheet, said heat insulator sheet material rolled into a reel with said second sheet having wrinkles formed therein.

* * * * *

UNITED STATES PATENT AND TRADEMARK OFFICE
CERTIFICATE OF CORRECTION

PATENT NO. : 6,857,238 B2
DATED : February 22, 2005
INVENTOR(S) : Robert J. Alderman It is certified that error appears in the above-identified patent and that said Letters Patent is hereby corrected as shown below:

Title page,
Item [57], ABSTRACT,
Line 2, change "is" to -- in --.

Column 1,
Line 32, change "radian" to -- radiant --.

Column 8,
Line 8, after the word "heat" add -- insulator --.
Line 28, change "has" to -- have --.
Line 50, change "oppossed" to -- opposed --.

Column 9,
Line 10, change "shined" to -- shirred --.
Line 51, change "bearing" to -- bears --.

Signed and Sealed this

Seventeenth Day of May, 2005

JON W. DUDAS
*Director of the United States Patent and Trademark Office*